United States Patent [19]

Griffioen et al.

[11] Patent Number: 5,211,377
[45] Date of Patent: May 18, 1993

[54] METHOD AND DEVICE FOR INSTALLING A CABLE IN A CABLE DUCT

[75] Inventors: Willem Griffioen, Ter Aar; Geert J. Prins, Delft, both of Netherlands

[73] Assignee: Koninklijke PTT Nederland N.V., Groningen, Netherlands

[21] Appl. No.: 729,570

[22] Filed: Jul. 15, 1991

[30] Foreign Application Priority Data

Jul. 17, 1990 [NL] Netherlands ................ 9001618

[51] Int. Cl.[5] ............................................. B66F 3/24
[52] U.S. Cl. ............................................... 254/134.4
[58] Field of Search .......... 254/134.3 FT, 134.3 R, 254/134.4; 15/109.06 R; 226/25, 43, 178

[56] References Cited

U.S. PATENT DOCUMENTS 4,856,760  8/1989  Frost et al. ............... 254/134.4
4,953,827  9/1990  Araki et al. .............. 254/134.4

FOREIGN PATENT DOCUMENTS 0251129  1/1988  European Pat. Off.
0287225  10/1988  United Kingdom.

OTHER PUBLICATIONS

IEEE Journal on Selected Areas in Communications, vol. SAC-4, No. 5, Aug. 1986, E. Hayashi et al., "Optical Fiber Cable Installation Techniques".
Review of the Electrical Communication Laboratories, vol. 29, No. 11-12, Nov.-Dec. 1981, K. Harada et al., Installation of Optical Fiber Cables.

Primary Examiner—Robert C. Watson
Attorney, Agent, or Firm—Frishauf, Holtz, Goodman & Woodward

[57] ABSTRACT

The invention relates to a method, a device and a method for installing a cable in a tubular cable duct. In the method, the foremost end (3) of the cable (1) in the duct (10) and subsequent portions of the cable are first accelerated in a short time with continuous supply of further portions of cable from a torsion-free store. Then, from the instant a certain speed v is reached, the cable is maintained at a tension such that, at said speed and tension, centrifugal forces in bends and inwardly pulling components of tensioning forces in the cable compensate for one another at the position of said bends, the further portions of the cable being supplied at a supply speed such that the part of the cable already fed into the duct can continue to slide on the basis of its mass moment of inertia. The acceleration can be achieved by causing propelling forces to act on the cable upstream of the inlet end (10a) of the duct in conjunction with pulling forces which act at least on the foremost end (3) of the cable (1) in the duct. The magnitude of at least the propelling forces is controlled by adjusting to zero the net transverse force on the cable, in a bend (8; 51) in the cable located beyond the position where the propelling forces act upon the cable in the direction of movement of the cable.

Advantages are that much higher installation speeds and/or greater installation lengths in one go are possible.

11 Claims, 2 Drawing Sheets

METHOD AND DEVICE FOR INSTALLING A CABLE IN A CABLE DUCT

BACKGROUND OF THE INVENTION

1. Field of the invention

The invention is in the field of installing a cable in a tubular cable duct. More particularly, the invention relates to a new installation method and device.

2. Prior art

In the case of the cable installation methods hitherto known, two types can in general be distinguished. A first type is distinguished in that a cable is pulled into the duct by exerting a pulling force on the foremost end of the cable. Such a method in which this is done with the aid of a winching wire attached to the foremost cable end is known, for example, from reference [1]. A method in which this is done with the aid of a pulling plug which is attached to the cable end and which is energised in the duct by means of compressed air is known, for example, from reference [2]. A disadvantage of a method of this type is that, as a consequence of the tension in the cable, the pulling force needed increases exponentially in the bends or undulations in the duct which are virtually always present. The second type of methods is distinguished in that the pulling force is as far as possible distributed over the entire length of the cable in the duct. In a method of said second type known from reference [3], this is achieved with the aid of a powerful air stream which is blown along the cable in the duct. Such a distributed pulling force is, as is further also known from references [4] and [5], possibly also supplemented by means of a locally exerted pushing force if the cable to be installed has sufficient stiffness for this purpose. Although very acceptable cable lengths can be installed in one piece by means of a method of the second type, the installation speed remains limited, however, by the nature of the method.

SUMMARY OF THE INVENTION

The object of the invention is to provide a method for introducing a cable into a cable duct, in which the forces which are necessary for the forward movement of the cable in the duct are essentially generated according to a principle other than hitherto customary and by which much higher installation speeds can be achieved. If, however, a cable has a much higher speed in the direction of installation than hitherto customary, proper account does now have to be taken of two effects which do not play any significant role at low speeds. The first effect is the occurrence of centrifugal forces in bends. The centrifugal force in a bend is inversely proportional to the bending radius of the bend. However, there is also a tensioning force in the cable, which tensile force has an inwardly pulling component, which is also inversely proportional to said bending radius, in such a bend. It is found in practice that, with a given tensioning force in the cable, it is always possible to find a speed at which said centrifugal forces are compensated for in each bend. The second effect is that a cable having a high speed in its longitudinal direction has a large kinetic energy owing to its mass of inertia, as a result of which it can continue to slide in said direction, frictional forces arising as a consequence of the cable weight being compensated for. During said continued sliding, all the forces are and remain distributed in a uniform manner over the entire length of the cable, with the result that no additional tensioning force can build up locally in the cable during this process. The invention is based on a suitable combination of these two effects.

According to the invention, a method for feeding a cable into a cable duct from an inlet end of the cable duct in the direction of an outlet end comprises for this purpose the following steps:

introducing a foremost end of the cable to be fed in, into the inlet end of the duct and thereby leading the foremost end and a following portion of the cable from a cable store via a predefined curved path towards the inlet end of the duct;

accelerating said foremost end and subsequent portions of the cable in the direction of said outlet end by exerting pulling forces on the foremost end of the cable while measuring net transverse forces experienced by the cable in said curved path, supplying further portions of cable to the inlet end of the duct with an increasing, or at least not decreasing, supply speed, so long as the measured net transverse forces correspond with a transverse component of the tension force larger than the centrifugal force.

In one embodiment, use is advantageously made of the fact that, at a certain speed v, the centrifugal forces and the inwardly pulling components of the tensioning forces compensate for one another in each bend in the cable in order to find said speed v during the acceleration to adjust the supply speed needed therefor for the cable, to said speed v.

The invention also provides a device for introducing a cable into a cable duct. According to the invention, such a device comprises for this purpose:

cable storage means, hereinafter sometimes referred to as a cable store, for the torsion-free storage of a cable, cable guide means for guiding the cable from the cable storage means in a smooth curve in the direction of the duct inlet end, transverse force measurement means sited near the cable in said curve in order to measure a transverse force exerted by the cable at that position and to emit a signal corresponding to said transverse force, cable supply means for supplying the cable to the duct inlet end, which supply means can be connected to the duct inlet end and are provided with a first inlet opening for the cable, cable propelling means for accelerating and maintaining at speed at least that part of the cable which has left the storage means during operation of the device, controllable drive means for driving the propelling means, control means for controlling the drive means of the propelling means as a function of the transverse force signal.

In a first variant of such a device, the cable is supplied from a torsion-free, unwound store. For this variant, a cable guide means having a large wheel diameter is used. In a second variant, the cable is supplied from a cable drum. For this purpose, a cable guide means is used which is rotatable around a shaft coaxial with the drum shaft.

REFERENCES

[1] European Patent Publication EP 0 152 720 entitled: Dispositif de commande d'un transporteur intermédiaire;

[2] European Patent Publication EP 0 251 129 entitled: Verfahren und Vorrichtung zum Einziehen von Kabel, insbesondere von Glasfaserkabel in ein Rohr;

[3] European Patent Publication EP 0 108 590 entitled: Optical fibre transmission lines;
[4] European Patent Publication EP 0 287 225 entitled: Optical fibre installation;
[5] W. Griffioen, "The installation of conventional fiber-optic cables in conduits using the viscous flow of air", in Journal of Lightwave Technology, Vol. 7, No. 2, February 1989, pages 297-302;
[6] Dutch Patent Application 9000462 (not yet published) entitled: Method of installing a cable in a cable duct and a pulling plug for use in said method.

BRIEF DESCRIPTION OF THE DRAWING

The invention will be explained in greater detail with reference to a drawing which comprises the following figures.

DESCRIPTION OF THE EXEMPLARY EMBODIMENTS

Figure 1:
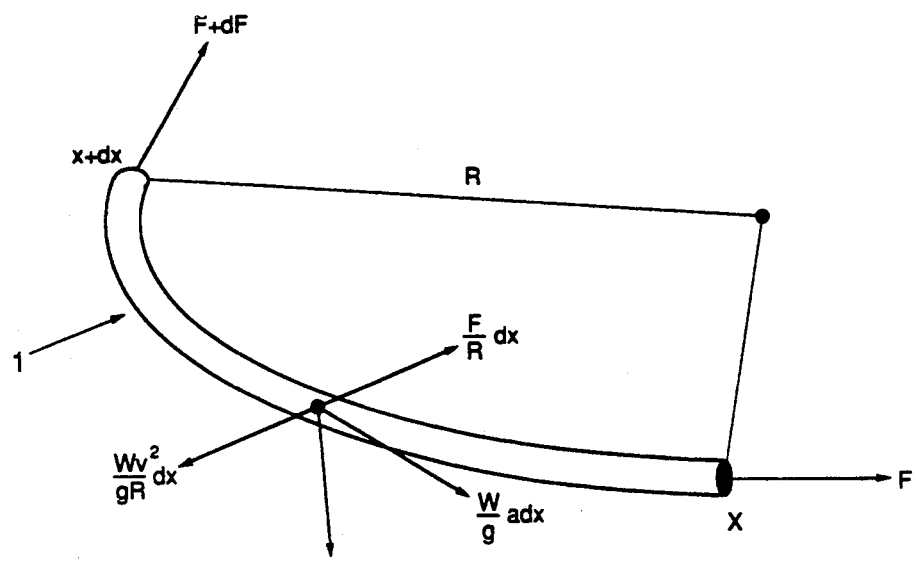
FIG. 1: diagrammatic representation of the force distribution on a bent short piece of a cable which is subject to an acceleration in its longitudinal direction.

Considerations which underlie the invention will be explained with reference to FIG. 1. This figure shows a bent short piece dx of a cable 1 which is undergoing an acceleration a in its longitudinal direction in a duct (not shown in this figure). The length coordinate along the cable 1 is denoted by x. F denotes the tensioning force which acts near a point x of the cable 1 as a consequence of pulling forces exerted on the cable 1 from outside. The change dF in said tensioning force F over the short piece dx of the cable 1 between x and x+dx can be described by a differential equation (1):

$$dF = [(W/g)a + (f/R)\{(WR)^2 + (F - Wv^2/g)^2\}^{\frac{1}{2}}]dx \quad (1)$$

where:
W = the cable weight per unit length,
g = the gravitational constant,
f = the coefficient of friction between cable and duct,
R = the radius of curvature of the cable at that position as a function of x,
v = the speed as first derivative of x with respect to the time t,
a = the acceleration as second derivative of x with respect to the time t.

In this equation, the change dF is made up of the following components indicated in the figure with arrows:
(W/g)adx = contribution as a consequence of the acceleration a,
(F/R)dx = inwardly pulling component of the tensioning force F,
$\{(Wv^2)/(gR)\}dx$ = contribution as a consequence of the centrifugal force,
Wdx = contribution as a consequence of the force of gravity.

It is pointed out in this connection that the geometrical sum of the three last-named components is perpendicular to the wall of the duct and, via the coefficient of friction f, results in a frictional force. Equation (1) assumes that the short piece of cable dx is situated in a flat plane, with the direction of the force of gravity perpendicular thereto. Although all kinds of spatial orientations occur in practice, the equation nevertheless remains a good approximation. In the known installation methods indicated above, the speeds and accelerations occurring therein are in general small and can, to a good approximation, be set equal to zero. From equation (1) it is evident that only effects of the force of gravity and the tensioning force then play a role. In the dynamic case, however, in which the speed v and the acceleration a are no longer negligible, the other terms also start to play an important role. But this also presents the possibility of looking for conditions under which the tensioning force can remain constant as far as possible over the entire length of the cable in the duct, so that no further force is built up and no undesirable pulling tensions can therefore occur in the cable. This is when dF=0. This situation is reached first and foremost when:

$$F = Wv^2/g \text{ and } a = -fg \quad (2)$$

that is to say when the effects of the tensioning force in the cable and the centrifugal force in every bend or curve compensate for one another and only the friction between cable and duct as a consequence of the force of gravity still plays a role. Starting from a point or instant at which the conditions according to (2) are fulfilled, the cable will then be able to continue to slide at a speed $v_0$, which then prevails, over a sliding length L for a sliding time T on the basis of its mass moment of inertia, in which case:

$$L = \tfrac{1}{2}v_0^2/(fg) \text{ and } T = v_0/(fg) \quad (3)$$

Even if the effects of the tensioning force and the centrifugal force do not compensate for one another precisely, a condition can be found under which dF=0, namely if:

$$a = -fg\{1 + (F_0/(WR))^2\}^{\frac{1}{2}} \quad (4)$$

in which $F_0$ is defined as $F_0 = F - Wv^2/g$, which is termed the effective tensioning force. The associated sliding length L is now:

$$L = \tfrac{1}{2}v_0^2[fg\{1 + (F_0/(WR))^2\}^{\frac{1}{2}}]^{-1} \quad (5)$$

It follows from (3) that, if the centrifugal forces are precisely compensated for in bends, the sliding length L is the greater, the greater the initial speed $v_0$ is. (5) reduces to (3) either if $R = \infty$, that is to say if the cable is completely straight, or if the effective tensioning force $F_0 = 0$, that is to say in the event of precise compensation. According to (5), said sliding length L is limited to the extent that this precise compensation is deviated from, and specifically, the more so the smaller the radius of curvature R in a bend is.

Since the speed v decreases from $v = v_0$ to $v = 0$ during continued sliding, the tensioning force F would also have to decrease for precise compensation. If this is not the case, but is, for example, the consequence of a constant pulling force exerted on the foremost end of the cable, this does not have to be problematical per se in practice. After all, the tensioning force F as a consequence of such a pulling force will gradually decrease in the longitudinal direction of the cable as a result of friction, starting from the foremost end until the level of precise compensation is reached. The additional tensioning force which transcends the level of precise compensation will, however, only result in additional friction and, consequently, development of heat. At very high speeds, however, said development of heat can in fact present problems. Use of a speed-dependent tensioning force F is then desirable. The equations (3) and (5) have been derived for flexible cables. The stiffness of the cable may nevertheless play a role in the distribution of force over the cable. The effect of this is in general small and may possibly be allowed for by means of a correction factor.

The method according to the invention makes use of the above by accelerating the foremost end of the cable in a short time, preferebly while simultaneously exerting a pulling force, and then maintaining it at a speed such that, in a bend via which said end is guided and in which the transverse force is continuously measured, said transverse force is essentially absent.

The method will be explained further below with reference to the description of two devices with which the method can be carried out.

Figure 2:
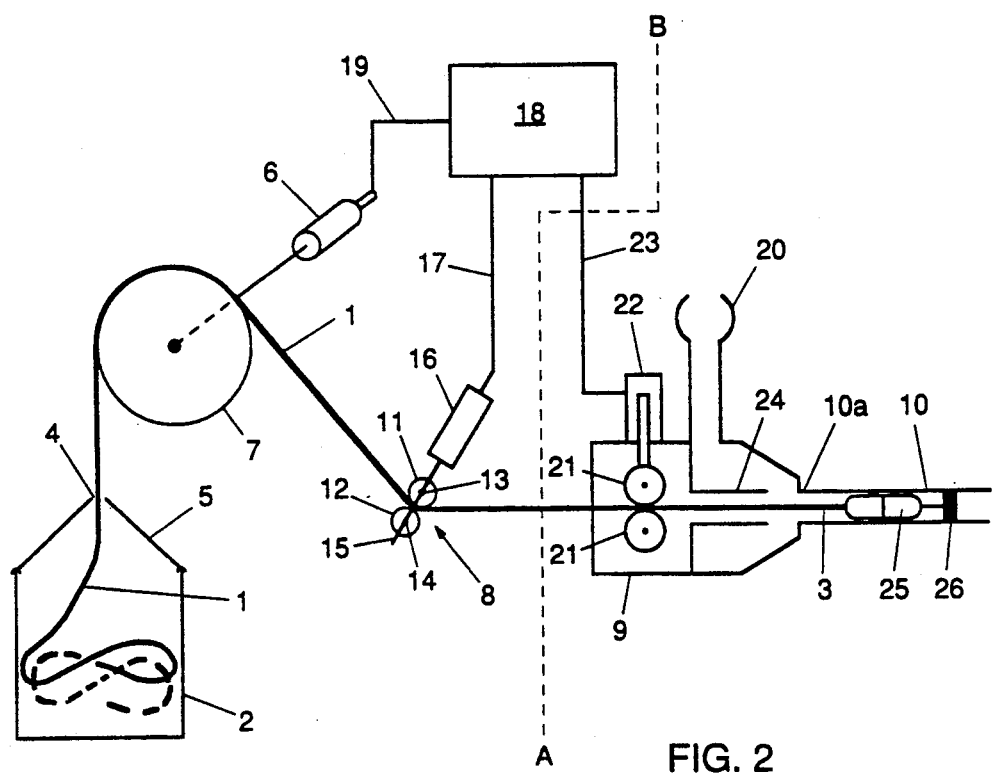
FIG. 2: diagrammatic representation of a first device according to the invention.

FIG. 2 diagrammatically shows a first device with which the method indicated above can be carried out. The cable 1 is stored essentially in torsion-free manner in a cable container 2. A foremost end 3 of the cable 1 first runs vertically upwards through an opening 4 in the top of a conical lid 5 of the container 2, then over a wheel 7 which can be mechanically driven by a motor 6 and via a bend 8 through a cable feed-in unit 9 into a cable duct 10. The wheel 7 is provided over the circumference with an antislip layer in order to be able to carry the cable along well during driving. In the bend 8, the cable is guided between two guide wheels 11 and 12 whose axes of rotation 13 and 14 respectively are mounted on a common frame 15 Which is coupled to a force transducer 16. Said force transducer 16 has a signal connection 17 to a control unit 18. Depending on a signal received via the signal connection 17, the control unit 18 controls the motor 6 via a control line 19. As known per se, the feed-in unit 9 may comprise two parts to be clamped on each other (not shown). It can be coupled in an airtight manner to an inlet end 10a of the duct 10 and has a supply opening 20 for compressed air and a set of wheels 21, at least one of which can be driven mechanically. The cable 1 may or may not be clamped between the set of wheels 21, which can be controlled via a signal connection 23 from the control unit 18, by means of a contact-pressure device 22. The cable is protected against compressed air flowing into the duct via the supply opening 20 by a protective tube 24. The foremost end 3 of the cable 1 in the duct 10 is connected via a universal joint 25, for example a ballbearing or a ball-and-socket joint, to a pulling plug 26 which seals the duct by circumferential suction.

The device operates as follows. The foremost end 3 of the cable 1 is first of all pulled by hand out of the cable container 2 and over the wheel 7, guided through between the guide wheels 11 and 12 in the bend 8 and attached to the universal joint 25 of the pulling plug 26 near the inlet end 10a. The pulling plug 26 is then fitted in the duct 10 and the feed-in unit 9 around the cable is connected to the inlet end 10a of the duct 10. A compressor (not shown) is connected to the supply opening 20 to deliver compressed air. The motor 6 is then started up from the control unit 18 via the control line 19 and raised to a high speed in a short time, as a result of which the wheel 7 is driven accordingly and the cable is pulled further out of the cable container 2 and propelled in the direction of the duct 10. Approximately simultaneously, but preferably somewhat earlier, the compressor is started up and the supply of compressed air to the duct 10 for energising the pulling plug 26 is consequently started via the supply opening 20, with the result that a pulling force is exerted on the foremost end 3 of the cable 1. The contact-pressure device 22, with which the set of wheels 21 is placed on the cable 1 and driven at a constant torque necessary for precise compensation of friction and pressure drop which the cable experiences on entering the feed-in unit 9 is also energised from the control unit 18 via the signal connection 23 from the instant that compressed air is supplied to the supply opening 20. As a result of this simultaneously exerted propelling, pulling force and pressure drop compensation, the cable is accelerated in a short time from the torsion-free store up to and including the foremost end 3, until a speed is reached at which the signal received by the control unit 18 via the signal connection 17 and originating from the force transducer 16 indicates that the transverse force exerted by the cable in the bend 8 on the guide wheels 11 and 12 is virtually zero. The control unit 18 is such that, starting from this instant, it regulates the motor 6, and consequently the drive of the wheel 7, via the control line 19 so that the state of the cable in the bend 8 in which the latter exerts no transverse force on the guide wheels 11 and 12 continues to be maintained as well as possible. Instead of being driven at a constant torque, the wheels 21 can be driven at a controllable torque with the contact-pressure device 22 being energised, in which case a 'transverse force zero' control can likewise be used. For this purpose, the cable 1 is also passed through a second bend beyond the contact-pressure device 22 near the inlet end 10a, that is to say in the space where the pressure of the compressed air prevails, in which bend the transverse force by means of which the torque to be delivered in the contact-pressure device 22 is then regulated via the control unit 18, is picked up in a similar manner to that in the bend 8. Such an additive 'transverse force zero' control also exerted on the means which cater for the pressure drop compensation in the feed-in unit resolves an uncertainty relating to the influence which the friction on the cable in the feed-in opening of the feed-in unit 9, where the pressure drop takes place, can still have on the acceleration and on the continued sliding of the cable subsequent thereto. The universal joint 25 is not absolutely necessary in this device, but it may absorb any small torsion of the cable 1 which the cable 1 may undergo around its longitudinal axis during the installation as a consequence of any helical movement of the pulling plug 26 in the duct 10.

Prior to the actual installation, the duct is preferably evacuated in order to minimise disadvantageous effects of an air cushion which may form in the duct in front of the pulling plug at the high speeds which can be reached during installation.

In order to be able to accelerate, the pulling force exerted on the foremost end 3 of the cable 1 must also always be effective backwards into the bend 8 during the acceleration. However, this rapidly becomes more difficult as a consequence of friction the more cable length there is situated in the duct, and especially if the duct section in which the cable is being accelerated also contains, in addition, many bends and undulations. The respective part of the cable must therefore be brought to as high a speed as possible in as short a time as possible. By adjusting the cable supply from then on by means of the wheel 7 in a manner such that the transverse forces on the cable in the bend 8, and also in any subsequent bend which the cable passes through, remain virtually absent, the accelerated part of the cable is maintained in a slip condition in which said part continues to slip, as it were, as a consequence of its mass moment of inertia. The cable supply is such that this condition is not adversely affected. Since some friction does in fact always occur, the speed slowly decreases. If a pulling plug 26 energised by means of compressed air is used, however, the pulling force exerted on the foremost cable end 3 is virtually constant over the entire duct section but is gradually no longer appropriate to the decreasing speed. This causes the friction to increase, with the consequence that the tensioning force F in the cable increases when viewed from the cable inlet end of the duct in the direction of the foremost cable end. Even if the said slip condition is thus preserved as well as possible in the duct 10 nearer the cable inlet end 10a, the tensioning force F in the cable will nevertheless always increasingly overcompensate for the centrifugal forces further on in the duct 10. Although instabilities as a consequence of which the cable may start to buckle will not then occur, the increasing friction will result in the development of heat. This effect may, however, remain limited if a partially penetrable pulling plug having a variable flow opening for the compressed air, such as is known per se from reference [6] is used to exert the pulling force on the foremost cable end 3. Reference is made here to a pressure-dependent variant such as is described with the aid of FIGS. 3b or 3c in reference [6]. However, the variable flow opening must in that case be so adjusted that, near the inlet end 10a of the duct where there is the greatest pressure drop across the pulling plug, the flow opening is still closed and that it gradually opens up more further on in the duct. From that instant onwards, the air stream of the compressed air in the duct is no longer stationary with respect to the cable but may reach such a great speed that it can also exert an additional entraining action on the cable, distributed over the entire length of the cable in the duct 10, which action has a favourable effect on the distribution of the tensioning force in the cable.

In a test situation, 1536 meters of single-fibre cable having a diameter of 3 mm was installed by means of this device using a closed pulling plug in a previously evacuated duct having an internal diameter of 26 mm in a span of time of somewhat more than 2 minutes. The highest speed, which was reached approximately 10 sec after the start, was 34 m/s.

The expectation is that the method will also work well in the installation of the standard 113 glass fibre cable currently much used in the Netherlands and having a diameter of 10 mm and a weight of 1N/m, which may be illustrated by a few computational results: starting from an initial acceleration of the cable of 0.2 g using a closed pulling plug which is energised with compressed air delivered by a compressor having a maximum working pressure of 9 bar and an output of 130 l/s, it is possible to reach an installation length of 1 km in a duct of 26 mm cross section in 61 sec with a maximum speed of 27 m/s for approximately one quarter of the time of installation;

an installation length of 2 km in a duct of 40 mm cross section in 89 sec with a maximum speed of 39 m/s also for approximately one quarter of the installation time.

However, a standard 113 glass fibre cable permits a maximum pulling force of 1800N. This corresponds to a compensation of centrifugal forces up to a speed of 133 m/s. If such a pulling force is used, an installation length of approximately 8 km would theoretically be achievable in a time span of approximately 2 min in a duct of 40 mm cross section and an initial acceleration of the cable of g m/sec$^2$ (constant of gravitation). However, such a pulling force can no longer be delivered by means of a pulling plug energised by compressed air. Such a pulling force can, however, be reached if a pulling cord which is coupled in one and the same manner to the foremost end 3 of the cable 1 and which is pulled by a winch sited at the other duct end is chosen instead for the purpose. A condition is, however, that the cord is such that it can be pulled through the duct (virtually) absolutely without friction at all the working speeds. The advantage of using a pulling cord pulled by a winch is that the pulling force of a winch is readily controllable as a function of speed. In addition, a feed-in unit in which pressure drop compensation is necessary, is superfluous because of the absence of compressed air. In order to limit friction of the stationary air if a pulling cord is used, the entire duct is preferably evacuated beforehand in this case as well.

Figure 3:
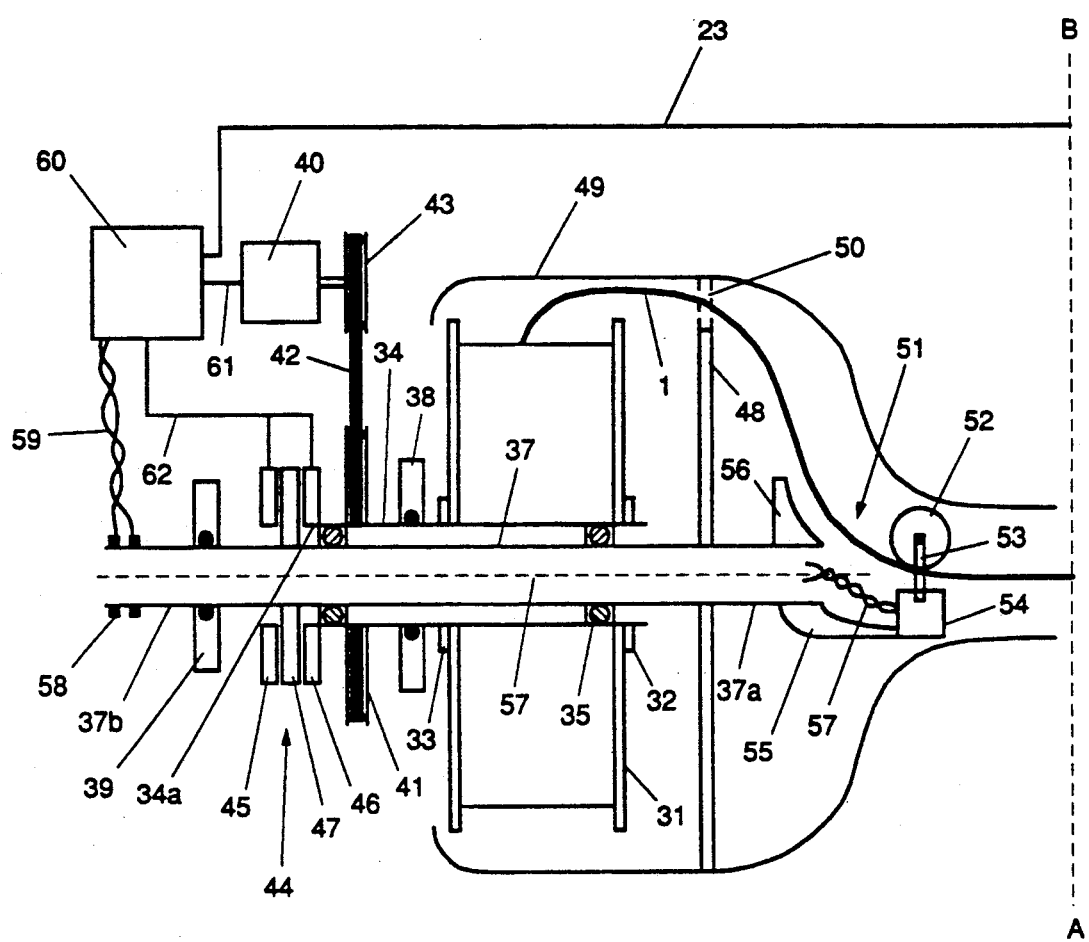
FIG. 3: the same of a second device.

Since a cable is customarily delivered on a cable drum, it is advantageous if a cable is fed directly from the drum store into the duct. A second exemplary embodiment will be described below in which this is possible. FIG. 3 diagrammatically shows a part of a device suitable for this purpose which is bounded at the right-hand side of the figure by a broken dash line A-B. The completing part of the device can be chosen as identical to the part shown on the right-hand side of a corresponding broken dash line A-B in FIG. 2, or to one of the variants thereof as described above. The cable 1 is wound around a cable drum 31 which is secured by means of hubs 32 and 33 on a hollow shaft 34. Said hollow shaft 34 is rotatably mounted by means of ballbearings 35 and 36 on a central shaft 37 which projects through the hollow shaft 34 and which is likewise hollow. On one side of the cable drum 31, both the hollow shaft 34 and the central shaft 37 are mounted in ballbearings 38 and 39, respectively. Said ballbearings 38 and 39 are supported from terra firma (not shown). The hollow shaft 34 can be driven by a motor 40 via a belt drive comprising a pulley 41 mounted on the hollow shaft 34, a belt 42 and a counter pulley 43 mounted on the shaft of the motor 40. The central shaft 37 can also be driven by the motor 40, and specifically, via a controllable brake clutch 44, known per se, which is sited on the central shaft 37 near one end 34a of the hollow shaft 34. This brake clutch 44 has a left-hand plate 45 which is always stationary with respect to terra firma, a right-hand plate 46 which is coupled in a fixed manner to the hollow shaft 34, and an armature 47 which is coupled so as to slide axially but in a tangentially fixed manner to the central shaft 37 and can be coupled in a controlled manner either to the right-hand plate 46 so that the central shaft 37 can rotate concomitantly with the hollow shaft 34, or to the left-hand plate 45 so that the central shaft 37 of the hollow shaft 34 is uncoupled and is rendered or held stationary. Mounted on the end 37a of the central shaft 37 projecting through the hollow shaft 34 at the other side of the cable drum 31, at the side of the hub 32, is a guide disc 48. Fitted on the circumference of said guide disc 48 coaxially with the central shaft 37 is a protective drum 49 which, at the one side of the guide disc 48, encloses the cable drum 31 and at the other side of the guide disc 48, converges in a bottleneck shape in the direction of the cable input unit 9. Provided in the guide disc 48 is a guide opening 50 through which the cable 1 can be guided from the cable drum 31 over a guide wheel 52 sited in a bend 51 out of the protective drum 49 in the direction of the feed-in unit 9 (see FIG. 2). The guide wheel 52 is rotatably mounted in a frame 53 which is coupled to a force transducer 54 which is mounted on the end 37a of the central shaft 37 projecting through the guide disc 48 by means of a connecting piece 55. Sited diametrically opposite the mounting point of the connecting piece 55 on the end 37a is furthermore a cable guide piece 56 to assist the guiding of the cable 1 in the bend 51. The whole, consisting of the guide disc 48, the protective drum 49, the guide wheel 52, the frame 53, the force transducer 54, the connecting piece 55 and the cable guide piece 56 is balanced for rotation with the central shaft 37. A signal connection 57 runs from the force transducer 54 through the hollow central shaft 37 to sliding contacts 58 on the other end 37b of the central shaft 37 and a further signal connection 59 runs from said sliding contacts to a control unit 60. Said control unit 60 also controls the motor 40 via a control signal connection 61 and controls the brake clutch 44 via a control signal connection 62. The signal connection 23, via which the contact-pressure device 22 of the input unit 9 (FIG. 2) can be energised is also connected to the control unit 40.

The operation is as follows. The foremost cable end 3 is first of all guided by hand from the full cable drum 31 through the guide opening 50 of the guide disc 48 via the bend 51 over the guide wheel 52 out of the protective drum 49 and via the feed-in unit 9 into the duct 10, and is coupled at that point to the pulling plug 26 in the same manner as described above. Then, with the clutch in the position in which the central shaft 37 and the hollow shaft 34 are coupled, the whole of the cable drum 31, the guide disc 48, the protective drum 49, the guide wheel 52, the force transducer 54 and the cable guide piece 56 is set in rotation with the aid of the motor 40 under the control of the control unit 60. Under these circumstances, the foremost cable end 3 rotates in the cable feed-in unit 9 and in the duct 10 with the same angular velocity around its longitudinal axis, and this is not obstructed by the presence of the universal joint 25. In the feed-in unit 9, the set of wheels 2 is not yet pressed onto the cable. When the cable drum 31 has been brought to the desired rotational speed, the compressed air is supplied to the supply opening 20 of the feed-in unit 9. The brake clutch 44 is thereupon switched over by the control unit 60 from the position in which the armature 47 is coupled to the disc 46 to the position in which the armature 47 is coupled to the disc 45, so that the central shaft 37, including the guide plate 48, the protective drum 49, the guide wheel 52 and the force transducer 54 are decelerated in a short time to the stationary state. At that instant the cable starts a forward movement in the duct 10, being pulled by the pulling plug 26 energised with compressed air. Simultaneously, the contact-pressure device 22 is energised by a signal from the control unit 60 via the signal connection 23. In this situation, the motor 40 continues to drive the hollow shaft 34 by means of the belt drive. The motor 40 is at the same time continuously adjusted from the control unit 60 in a manner such that the signal from the force transducer 54 received by the control unit 60 via the signal connections 57 and 59 essentially indicates that the transverse force exerted on the guide wheel 52 by the cable 1 in the bend 51 is zero. The variants, described above in the case of the first device, for exerting the pulling force on the foremost end 3 of the cable 1 can also be used in this second device, including the evacuation of the duct prior to the actual installation of the cable.

From considerations of stability, it may be advantageous that, during operation of the device, the protective drum is additionally supported, for example by an endless conveyor belt or short roller conveyor which is sited underneath the protective drum, and the belt of which can concomitantly run due to friction, or the rollers of which can rotate concomitantly with the outside wall of the protective drum, or even be decelerated, if the brake clutch 44 is switched over in order to stop the central shaft 37.

Since, in a device which has been described with the aid of FIG. 3, the cable is in fact already at speed at the instant when the foremost end 3 of the cable 1 shoots further into the duct 10, the acceleration to be achieved will hardly be subject to any limitation. The curvature of the path and the duct diameter used will also hardly be limiting factors for the results to be achieved with this device. The limiting factor is in this case the speed with which the brake clutch 44 can be switched over and the central shaft 37, including protective drum 49, the guide disc 48 and the force transducer 54 with the guide wheel 52 can be brought to the stationary state.

It has been calculated that, with a standard 113 cable on which a pulling force of 1800N is exerted, even an installation length of more than 10 km is feasible, again in approximately 2 minutes.

A further device for using the method according to the invention is one in which the acceleration is achieved by giving the filled cable drum a high rotational speed from the stationary state in a short time with the aid of a controllable clutch with flywheel drive. Since this requires a very heavy clutch, this solution has not been elaborated in greater detail.

A shorter cable length gives however the possibility to install a cable from a cable reel, which is directly driven by a controlled motor with a restricted power, in a similar manner as described in connection to the embodiment of FIG. 2. Thus a light-weigth PVC-jacketed single-fibre cable (weight: 0,12N/m, diameter: 3 mm) could be installed in a shorter trajectory (length: 85 m) of a special "dry-lubricated" HDPE duct (inner diameter: 12 mm) in only 7 sec. Because the trajectory was an extremely looped one (including five right-angled curves in the first 45 m, and six loops of 360° in the last 40 m), an additive 'transverse force zero' control in a second bend inside the pressurized space was used.

We claim:
1. Method for introducing a cable into a cable duct from an inlet end of the cable duct in the direction of an outlet end, which method comprises the following steps:
   inserting a foremost end of the cable to be introduced into the inlet end of the duct and thereby leading the foremost end and a following portion of the cable from a cable store via a predefined curved path towards the inlet end of the duct;
   accelerating at least said foremost end and subsequent portions of the cable in the direction of the outlet end by exerting pulling forces on the foremost end of the cable, while measuring net transverse forces experienced by the cable in said curved path, and supplying further portions of cable from the cable store via said curved path to the inlet end of the duct with an increasing, or at least not decreasing, supply speed, so long as the measured net transverse forces correspond with a transverse component of the tension force larger than the centrifugal force and at reaching maximum supply speed, supplying further cable portions from the store with a supply speed being controlled by adjusting to zero the net transverse forces on the cable in the curved path, thereby maintaining the exertion of said pulling forces.

2. Method according to claim 1, characterised in that the pulling forces are generated by means of a pulling plug energised by means of compressed air and connected to the foremost end of the cable.

3. Method according to claim 2, characterised in that the pulling forces are concomitantly generated by an airstream which is fed at great speed through the duct past the cable when the cable is being supplied, the pulling plug being in part penetrable by said airstream.

4. Method according to claim 3, characterised in that the pulling forces are speed-dependent, the pulling plug being in part penetrable in a pressure-dependent way.

5. Method according to claim 2, characterised in that the duct is evacuated prior to the acceleration step.

6. Method according to claim 1, characterised in that the pulling forces are generated by means of a pulling wire which is introduced into the duct beforehand and connected to the foremost end of the cable and which has low friction with respect to the inside wall of the duct.

7. Method according to claim 6, characterised in that the pulling forces are speed-dependent, the pulling wire being pulled by a winch, which is controllable as a function of speed.

8. Method according to claim 7, characterised in that the duct is evacuated prior to the acceleration step.

9. Method according to any of claims 2-8, characterized in that the cable is supplied from loops in a torsion-free store via a controllably driven conveyor wheel.

10. Method according to any one of claims 2-8, characterized in that the cable is supplied from a controllably rotating cable drum.

11. Method according to claim 10, characterized in that the cable drum is given an initial rotational speed before carrying out the step of accelerating at least said foremost end and said subsequent portions of the cable in the direction of said outlet end.

* * * * *